March 18, 1958  C. F. KAEGEBEIN  2,827,014
EGG COLLECTING AND RETAINING NESTS
Filed Aug. 23, 1955  2 Sheets-Sheet 1
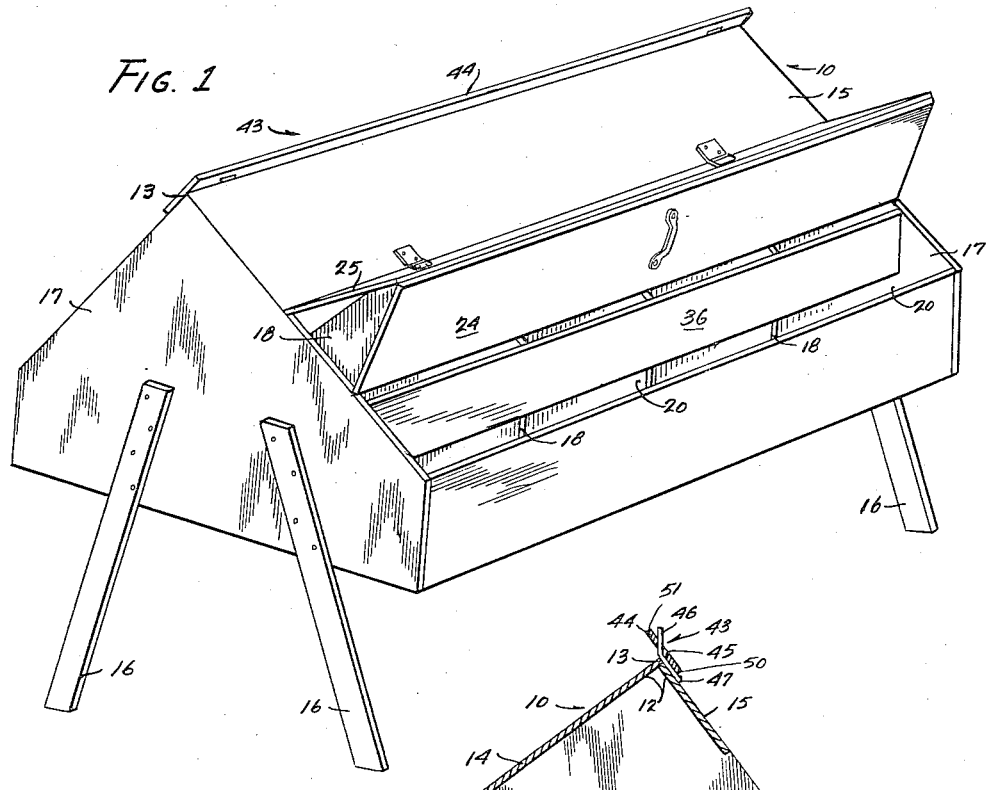
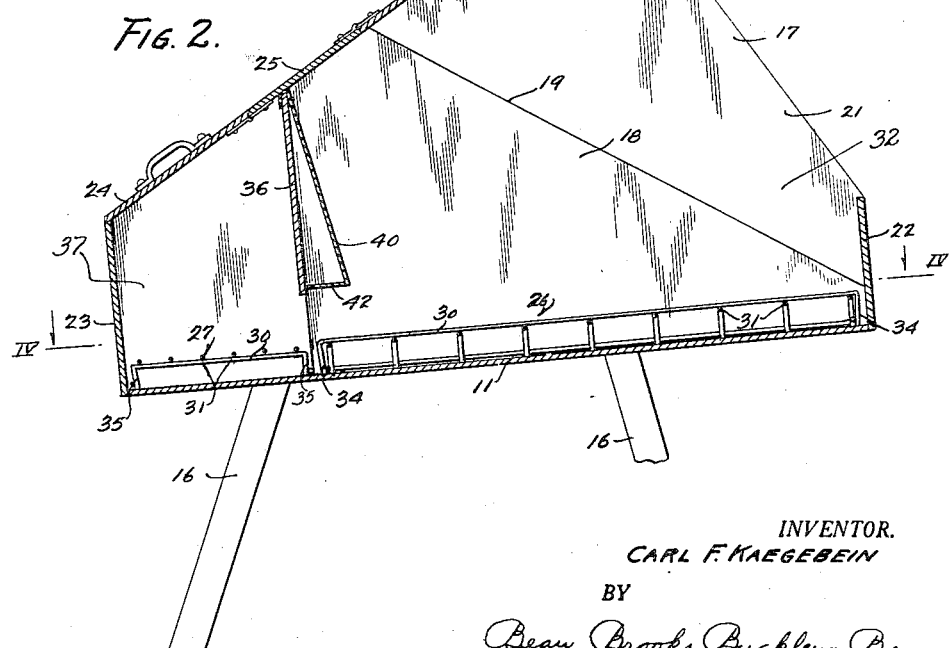
INVENTOR.
CARL F. KAEGEBEIN
BY
Bean, Brooks, Buckley & Bean
ATTORNEYS March 18, 1958  C. F. KAEGEBEIN  2,827,014
EGG COLLECTING AND RETAINING NESTS
Filed Aug. 23, 1955  2 Sheets-Sheet 2
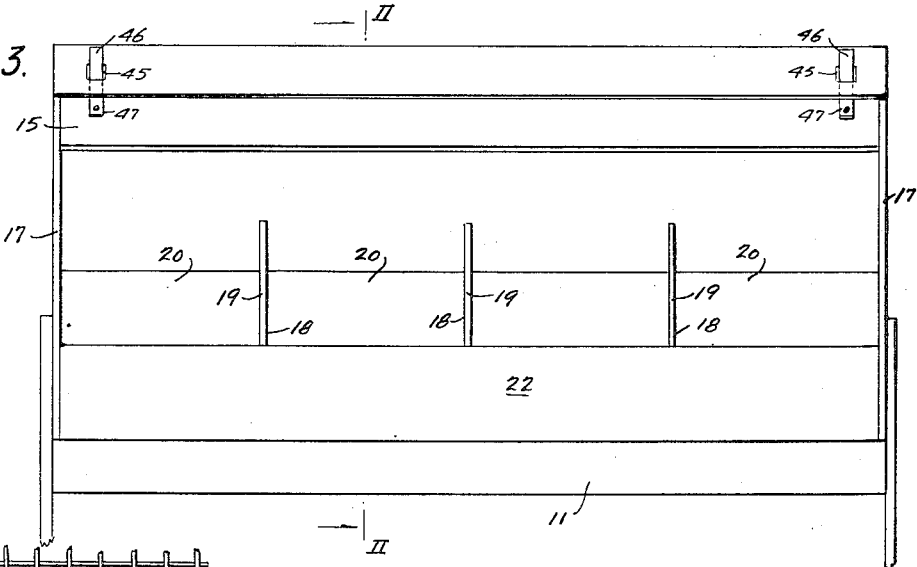
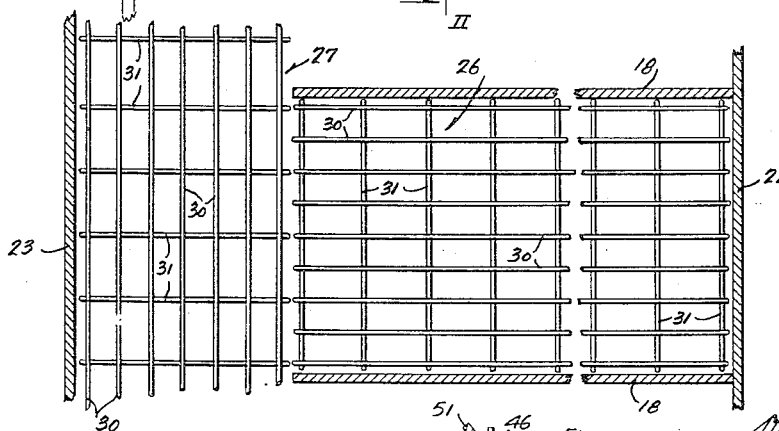
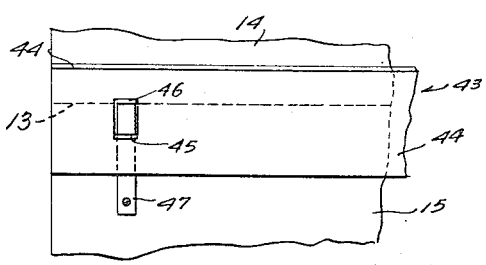
INVENTOR.
CARL F. KAEGEBEIN
BY
Beau, Brooks, Buckley + Bean
ATTORNEYS

2,827,014

EGG COLLECTING AND RETAINING NESTS

Carl F. Kaegebein, Grand Island, N. Y.

Application August 23, 1955, Serial No. 530,100

6 Claims. (Cl. 119—48)

My invention relates in general to improvements in poultry nests, and in particular to an egg collecting and retaining nest.

The principal object of my invention is to provide a nest having a laying compartment and an egg gathering manger each having a separate wire mesh floor, the mesh of which being so arranged that the eggs will be readily rolled out of the laying compartment and will be retarded in their movement over the floor of the egg manger.

Another object is to provide a spacer shield on the dividing wall separating the laying compartment from the egg manger to increase the space between these compartments and thereby make it more difficult for the hens to reach the eggs in the egg manger.

A further object is to provide a nest having a reel carried by the ridge of the gable-shaped roof which prevents the hen from perching thereon.

The above objects and advantages have been accomplished by the device shown in the accompanying drawings, of which:

Fig. 1 is a perspective view showing the back side of the nest;

Fig. 2 is an enlarged transverse sectional view taken on line II—II of Fig. 3;

Fig. 3 is a front view of the device;

Fig. 4 is an enlarged fragmentary sectional plan view taken on line IV—IV of Fig. 2 showing the wire mesh floors of both compartments of the nest;

Fig. 5 is an enlarged fragmentary sectional view taken on line II—II of Fig. 3 showing the spacer shield;

Fig. 6 is an enlarged fragmentary sectional view taken on line II—II of Fig. 3 showing the reel of my nest;

Fig. 7 is a fragmentary plan view of the same; and

Figs. 8 and 9 show fragmentary views of modified forms of spacer shields.

My device comprises a housing 10 having an inclined bottom 11 to which end walls 17 are connected. The upper edges of the end walls are gable-shaped and support a gable ceiling or roof 12 having a ridge 13 and formed with an inclined rear portion 14 and preferably with an inclined front portion 15. Suitable supporting legs 16 are provided for the nest and these may be removably secured to the end walls 17 of the housing. While my device may be formed with but one stall, it is preferable to form a number of stalls 20 in the housing by the use of a number of permanently arranged separating walls 18. As shown in Fig. 2 these walls extend from the rear of the laying compartment 32 toward the front of the nest but the front edge 19 thereof is cut away and does not extend up to the ridge 13. The front edges of these walls are so positioned that if too many hens attempt to occupy one stall, those nearest the walls will be crowded over into the next stall.

An entrance opening 21 is formed across the front of the housing thereby providing access to the stalls. A front wall 22 is arranged at the front of the housing and serves to define the lower edge of the entrance opening 21, the upper edge thereof being defined by the lower edge of the inclined front portion 15 of the ceiling. The rear portion of the ceiling is inclined downwardly and it extends from the ridge 13 to a back wall 23 bounding the egg gathering manger 37. Hinged members 24 and 25 are provided at the rear portion of the ceiling which may be opened, as shown in Fig. 1 to uncover the egg gathering manger and to permit access to the interior of the housing.

As clearly shown in Fig. 2, the front wall 22 extends upwardly from the bottom 11 and the upper edge thereof is positioned forwardly of the lower edge of the front portion 15 of the ceiling, whereby the front wall acts as a perch and makes it necessary for the bird to alight thereon before entering the stall thereby initially placing her partially within the stall or laying compartment. This construction provides a partially open nest readily accessible to the birds even when the nest is placed with its entrance side against the wall. In such position it will be evident from Fig. 2 that the effective size of the opening when approached from above in a vertical plane is not restricted. The opening can never be closed no matter in what position the nest is placed, and the size of the openings is never less than the distance between vertical planes passing through the lower edge of the front portion 15 of the ceiling and the upper edge of the front wall 22.

A removable wire mesh floor 26 is placed within each of the laying compartments, and a removable wire mesh floor 27 is provided for the egg gathering manger. The manger floor may be made in one piece or it may be divided into a number of sections to make it more convenient to handle.

Each of these floors is preferably made from what is known as welded wire and is of relatively coarse mesh. In such wire, as is well understood, there is a plurality of spaced line wires 30 underneath which is disposed a plurality of spaced stay wires 31. Since it is desirable that the eggs be removed as quickly as possible from the egg laying compartment, the wire mesh floor 26 of each of these compartments is arranged with the line wires 30 extending from the front to the back of the compartment on the inclined plane of the bottom 11 so that eggs deposited thereon will be quickly rolled out of the laying compartment and into the egg manger. However, it is desirable that the eggs, having once reached the egg manger, will be retarded in their movement over the entire width of the manger floor and thereby be prevented from bumping against the back wall 23 with sufficient force to crack them. The wires in the egg manger floor 27 are, therefore, so arranged that the line wires 30 run longitudinally of the manger and laterally with respect to the line wires of the compartment floors 26. The wire mesh floors 26 and 27 are provided with downward extending flanges 34 and 35, respectively. The flange 34 preferably extends around the perimeter of the floor 26, whereas the flanges 35 of the floor 27 are provided along the longitudinal edges only. These flanges are preferably bent inwardly slightly beyond 90° with the face of the floor to facilitate removal thereof. As shown in Fig. 2 it is preferable that the flange 35 of the egg manger flooring 27 is shorter than the flanges 34 of the laying compartment floors so that the upper surfaces of the floor of the egg manger will be below the upper surfaces of the floors of the laying compartment, whereby when an egg once rolled off the rear end of the laying compartment floor, it will drop to the surface of the egg manger floor which makes it impossible for the hen ever to retrieve it.

A dividing wall 36 extends across the back of the stalls at the rear ends thereof and serves to divide each of the hens' stalls 20 from the egg manger 37. This partition which extends from one end wall to the other is preferably secured to the rear edges of the separator walls 18 and has its lower edge spaced above the wire mesh stall floors 26 a distance equal to substantially one-quarter of the space between the top of the floor 26 and the ceiling 14, whereby eggs rolling down the inclined floor of the laying compartment are allowed to pass under the partition and be deposited in the manger. Supported by the partition 36 is the spacer shield 40 of my invention which comprises preferably a strip of sheet metal provided at its upper edge with an attachment flange 41 which conforms preferably to the angle of the ceiling or roof 12 of the housing and which extends down along the face of the manger side of the dividing wall thus holding the spacer in position. The shield, which together with the partition provides a tapered spacer, is placed on the face of the dividing wall which is exposed to the laying compartment so as to provide an inclined surface facing said compartment, and it is provided with an inwardly extending spacer flange 42 extending along the lower edge thereof for maintaining the shield in outwardly inclined relation to the partition 36. The width of the flange 42 together with the thickness of the partition 36 increases the space between the two adjacent compartments which discourages a hen from reaching into the egg manger and causing breakage of the eggs. As shown in the modification of Fig. 8, the spacer shield 52 is provided with a flange 53 and it is secured to the dividing wall 36 by having this flange clamped between the upper edge of the partition and the bottom surface of the inclined portion 14 of the ceiling 12. In the modification shown in Fig. 9, the shield 54 is formed at its upper edge with a flange 55 which is secured to the dividing wall by means of screws or the like. However, I have found that the presence of the spacer flange is of importance because the comb of the hen will strike it and make it more difficult for her to put her head through the spacer below the partition.

As shown in Figs. 6 and 7, my device is provided with a reel 43 located along the ridge 13 of the housing to prevent fowl from perching thereupon. It consists of a substantially flat member 44 formed with a number of apertures 45 each of which engages an upstanding arm 46 carried by the ridge 13. The apertures are large enough to permit sliding of the member on the arms whereby the member will be tiltably supported along the ridge. The arms preferably extend upwardly in a vertical plane and each has an extension 47 for attachment to either of the rear or front portion of the roof. The apertures 45 are preferably equi-distantly spaced from the edges 50 and 51 so that the member 44 will be kept in either the full line or the dotted line position by gravity since when either side of the openings are in contact with the arms 46, the center of balance will be such that the member will be tilted as shown in Fig. 6. The width of the member is such that the hens cannot grasp both edges 50 and 51 at the same time; and from the foregoing it will be obvious that when, for instance, a hen attempts to rest upon the edge 51, her weight will tip the member and cause it to slide down onto the front portion 14 of the ceiling. Likewise, if the member is in a position shown in dotted lines and the hen attempts to alight upon the edge 50, the member will be tilted and will slide down and assume the position shown in full lines in this figure.

Obviously, while I have shown and described the spacer shield as being separate from and carried by the dividing wall, it is obvious that the shield may be so formed as to provide both partition and shield. These and other modifications may be made without departing from the spirit of my invention and the appended claims; and I do not, therefore, wish to be limited to the exact details herein shown and described.

What is claimed is:

1. A hen nest comprising an enclosure having means defining a laying compartment and a manger compartment, said nest having a bottom inclined from the laying compartment downwardly to and including said manger compartment, a wire floor in said laying compartment supported by said bottom and having a top surface comprised of parallel wires extending downwardly toward said manger compartment, a wire floor in said manger compartment supported by said bottom and having a top surface of parallel wires normal to said first mentioned wires, and a dividing wall between said compartments extending upwardly and providing a space between its bottom edge and the first mentioned top surface greater than the maximum dimension of a hen's egg.

2. A hen nest comprising an enclosure having means defining a laying compartment and a manger compartment, said nest having a bottom inclined from the laying compartment downwardly to and including said manger compartment, a wire floor in said laying compartment supported by said bottom and having a top surface comprised of parallel wires extending downwardly toward said manger compartment, a wire floor in said manger compartment supported by said bottom and having a top surface of parallel wires normal to said first mentioned wires, a dividing wall between said compartments extending upwardly and providing a space between its bottom edge and the first mentioned top surface greater than the maximum dimension of a hen's egg, and a tapered spacer shield adjacent said dividing wall and disposed on the laying compartment side thereof.

3. A hen nest comprising an enclosure having means defining a laying compartment and a manger compartment, said nest having a bottom inclined from the laying compartment downwardly to and including said manger compartment, a wire floor in said laying compartment supported by said bottom and having a top surface comprised of parallel wires extending downwardly toward said manger compartment, a wire floor in said manger compartment supported by said bottom and having a top surface of parallel wires normal to said first mentioned wires, a dividing wall between said compartments extending upwardly and providing a space between its bottom edge and the first mentioned top surface greater than the maximum dimension of a hen's egg, and a spacer shield disposed on the laying compartment side of said dividing wall, said shield having an attachment flange along its upper edge for engagement with the upper edge of said dividing wall, and a spacer flange along the lower edge of said shield to maintain the said shield in outwardly inclined relation to said dividing wall, whereby the effective thickness of said dividing wall is increased.

4. A hen nest comprising an enclosure having means defining a laying compartment and a manger compartment, said nest having a bottom inclined from the laying compartment downwardly to and including said manger compartment, a wire floor in said laying compartment supported by said bottom and having a top surface comprised of parallel wires extending downwardly toward said manger compartment, a wire floor in said manger compartment supported by said bottom and having a top surface of parallel wires normal to said first mentioned wires, a dividing wall between said compartments extending upwardly and providing a space between its bottom edge and the first mentioned top surface greater than the maximum dimension of a hen's egg, said nest having gable shaped side walls joined by an inclined roof having front and back portions joined at an angle of substantially 90° thereby forming a ridge, a reel carried by said ridge, said reel comprising a substantially flat member extending lengthwise of said roof, and means for supporting said reel in a manner to permit limited lateral sliding motion, whereby said reel will be maintained in lateral off-balance by gravity.

5. A hen nest comprising an enclosure having means defining a laying compartment and a manger compartment, said nest having a bottom inclined from the laying compartment downwardly to and including said manger compartment, a wire floor in said laying compartment supported by said bottom and having a top surface comprised of parallel wires extending downwardly toward said manger compartment, a wire floor in said manger compartment supported by said bottom and having a top surface of parallel wires normal to said first mentioned wires, a dividing wall between said compartments extending upwardly and providing a space between its bottom edge and the first mentioned top surface greater than the maximum dimension of a hen's egg, said nest having gable shaped side walls joined by an inclined roof having front and back portions joined at an angle of substantially 90° thereby forming a ridge, a reel carried by said ridge, said reel comprising a substantially flat member extending lengthwise of said roof and formed with a number of relatively large apertures arranged along the longitudinal center thereof, an arm carried by said ridge and having an upwardly extending portion passing through each of said apertures, each of said arms having a thickness less than the lateral extent of said apertures, whereby the reel will be maintained in lateral off-balance position by gravity.

6. A hen nest comprising an enclosure having means defining a laying compartment and a manger compartment, said nest having a bottom inclined from the laying compartment downwardly to and including said manger compartment, a wire floor in said laying compartment supported by said bottom and having a top surface comprised of parallel wires extending downwardly toward said manger compartment, a wire floor in said manger compartment supported by said bottom and having a top surface of parallel wires normal to said first mentioned wires, a dividing wall between said compartments extending upwardly and providing a space between its bottom edge and the first mentioned top surface greater than the maximum dimension of a hen's egg, a tapered spacer shield adjacent said dividing wall and disposed on the laying compartment side thereof, said nest having gable shaped side walls joined by an inclined roof having front and back portions joined at an angle of substantially 90° thereby forming a ridge, a reel carried by said ridge, said reel comprising a substantially flat member extending lengthwise of said roof and formed with a number of relatively large apertures arranged along the longitudinal center thereof, an arm carried by said ridge and having an upwardly extending portion passing through each of said apertures, each of said arms having a thickness less than the lateral extent of said apertures, whereby the reel will be maintained in lateral off-balance position by gravity.

References Cited in the file of this patent

UNITED STATES PATENTS

| | | |
|---|---|---|
| 1,655,691 | Ellman | Jan. 10, 1928 |
| 2,279,147 | Stimson | Apr. 7, 1942 |
| 2,603,183 | Schroer | July 15, 1952 |
| 2,612,862 | Ipsen | Oct. 7, 1952 |
| 2,623,499 | King | Dec. 30, 1952 |
| 2,676,566 | Krieger | Apr. 27, 1954 |
| 2,692,578 | Manning | Oct. 26, 1954 |
| 2,694,381 | Kaegebein | Nov. 16, 1954 |
| 2,695,006 | Tellefson | Nov. 23, 1954 |